United States Patent [19]

Gatlyn

[11] 4,020,583
[45] May 3, 1977

[54] SNAG-PROOF FISHING LURE

[76] Inventor: Jennings B. Gatlyn, 1123 Viewmont Drive, Escondido, Calif. 92027

[22] Filed: Dec. 5, 1975

[21] Appl. No.: 638,039

[52] U.S. Cl. ............................. 43/42.41; 43/37; 43/43.4

[51] Int. Cl.² ........................................ A01K 85/02

[58] Field of Search ............... 43/42.41, 35, 42.04, 43/42.05, 42.08, 42.5, 42.52, 42.36, 42.37, 43.4, 36, 37, 42.4

[56] References Cited

UNITED STATES PATENTS

| | | | |
|---|---|---|---|
| 1,994,878 | 3/1935 | Smith et al. | 43/35 |
| 2,392,677 | 1/1946 | Lauby | 43/42.41 |
| 2,611,208 | 9/1952 | Alexath | 43/42.41 |
| 2,614,356 | 10/1952 | Kaves | 43/42.41 |
| 2,956,364 | 10/1960 | Kuckiewicz | 43/42.04 |
| 3,411,233 | 11/1968 | Hopper | 43/35 |

Primary Examiner—Louis G. Mancene
Assistant Examiner—Peter K. Skiff
Attorney, Agent, or Firm—Edward A. Sokolski

[57] ABSTRACT

A plate member has a wire or strip spring attached to one end thereof, a fish hook being attached to the other end of the spring. The barb of the hook is received in a slot formed in the plate, the spring operating to resiliently urge the end of the hook against the plate wall such that the hook end is shielded by the plate. The fishing line is attached to the hook at or near its junction with the spring and guided through an eye in the plate directly opposite this attachment point. The hook is thus effectively masked by the plate so that it cannot become entangled in weeds, sticks and the like. When the fish's mouth strikes the hook, the fisherman pulls on the line which causes movement of the hook away from the plate, thereby enabling the fisherman to set the hook in the fish's mouth.

7 Claims, 9 Drawing Figures

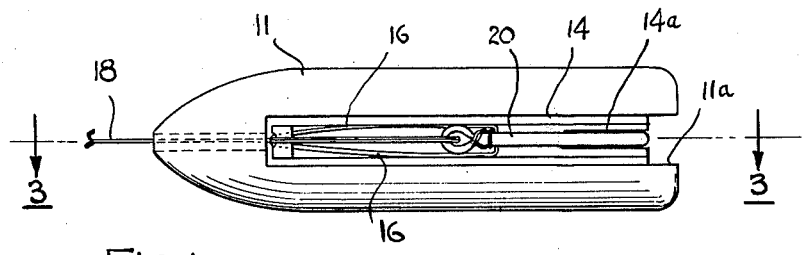
FIG. 1
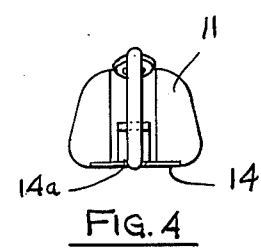
FIG. 4
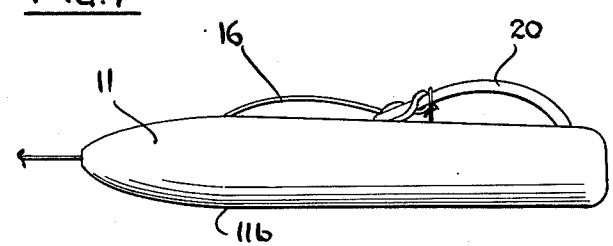
FIG. 2
FIG. 9
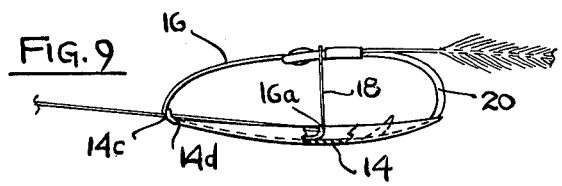
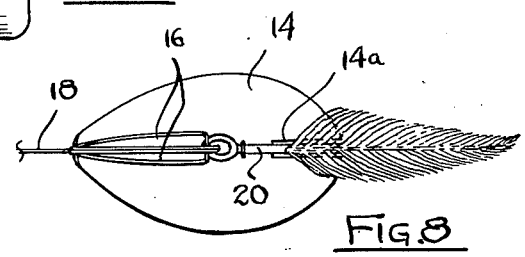
FIG. 8
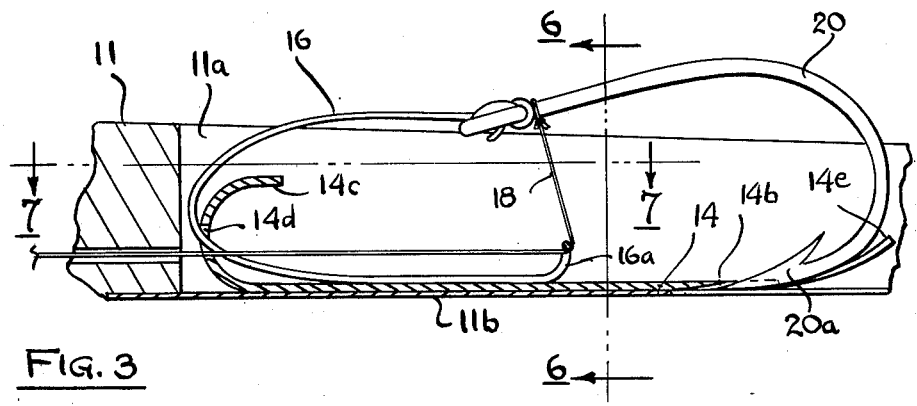
FIG. 3
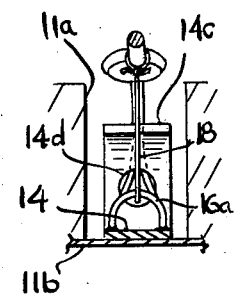
FIG. 6
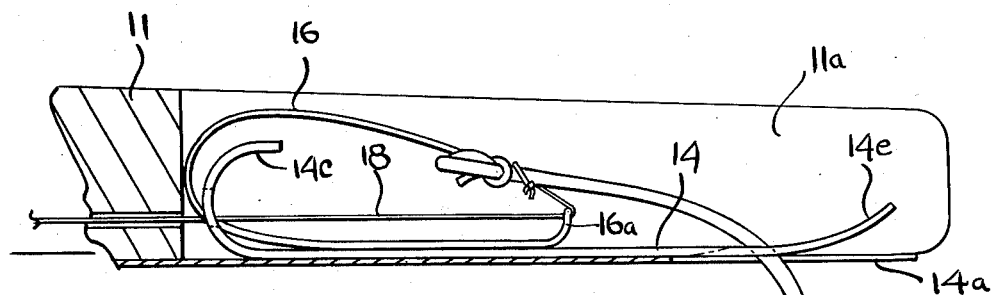
FIG. 5
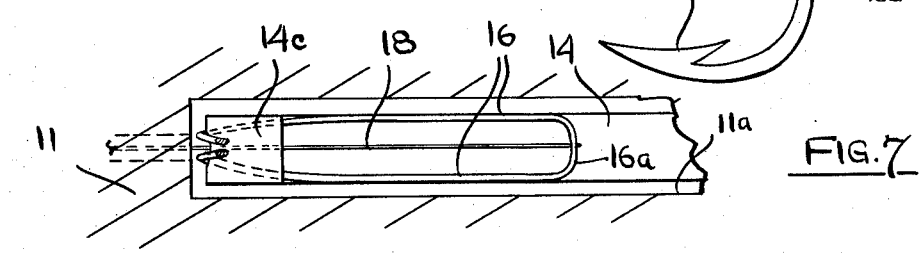
FIG. 7

SNAG-PROOF FISHING LURE

This invention relates to fishing lures, and more particulary to a improved snag-proff lure.

Snag-proof lures have been developed over the years to prevent the entanglement of the fish hook in weeds and the like. Many of these devices utilize spring mechanisms which keep the hook in a retracted shielded position until the fish bites, whereupon the hook becomes exposed. In most of these devices, however, it is not possible for the fisherman to control the movement of the hook from its retracted position. Certain prior art devices in which such control is afforded are overly complicated in their construction and do not respond to pressure from the fish's bite, operating solely in response to the fisherman's control. The present invention provides a significant improvement over the prior art in that provides both movement of the hook from its retracted position by the fish's bite and further enables the fisherman to set the hook immediately after the fish bites by rapidly pulling on the line.

It is therefore an object of this invention to facilitate the setting of the hook in the fish's mouth in a snag-proof lure.

Other objects of this invention will become apparent as the description proceeds in connection with the accompanying drawings, of which:

FIG. 1 is a top plan view of a first embodiment of the invention incorporated into a minnow type lure;

FIG. 2 is a side elevational view of the first embodiment;

FIG. 3 is a cross-sectional view taken along the plane indicated by 3-3 in FIG. 1;

FIG. 4 is an end elevational view of the first embodiment;

FIG. 5 is a cross-sectional view of the first embodiment shown with the hook being set by the fisherman;

FIG.6 is a cross-sectional view taken along the plane indicated by 6-6 in FIG. 3;

FIG. 7 is a cross-sectional view taken along the plane indicated by 7-7 in FIG. 3;

FIG. 8 is a top plan view of a second embodiment of the invention incorporated into a spoon type lure; and FIG. 9 is a side elevational view of the second embodiment.

Briefly described, the invention is as follows: A plate member which may be incorporated into a minnow, spoon, or other type of lure, has a slotted portion at one end thereof which accomodates the barb of the fish hook in a manner such that the plate provides a shield for the hook when it is retained in this slotted portion. The end of the hook opposite the barb is attached to a wire or hook spring which is anchored on the plate. The fishing line leader is attached to the hook at or near the junction between the hook and spring and drawn through an eye on the plate at a point approximately opposite the attachment point. The spring resiliently urges the hook outwardly to a position where the barb is in the slotted portion with the point thereof abutting against the plate, where it is noramlly retained. The barb is moved away from the plate when the fish bites on the lure, and further moved in this direction when the fisherman rapidly pulls the fishing line, the hook thereby being set in the fish's mouth.

Referring now to FIGS. 1-7, a first embodiment of the invention is illustrated. Body portion 11 is in the shape of a tadpole or minnow and has an elongated channel portion 11a formed therein. Fixedly attached to the bottom wall 11b of the channel portion is an elongated plate 14. Plate 14 has a slot 14a formed in one end thereof. Positioned in the slot in an inwardly turned tab portion 14b. The end of plate 14 opposite the slot has a curled up portion 14c. Fixedly attached to plate 14, as for example by soldering or welding, is wire spring 16. Spring 16 is bent in a U-shaped and is fitted through aperture 14d formed in the curled portion 14c. Attached to the end of spring 16, as for example by soldering or welding, is fish hook 20. The fish hook is resiliently urged by spring 16 so that barb 20a is retained n slot 14a with the point of the barb abutting against tab portion 14b of the plate. The end of fish line leader 18 is attached to hook 20 at its junction with spring 16, the leader being fitted through eye 16a formed in tab formed in the end of the spring which is fixedly attached to plate 14. The line further passes through aperture 14d. Alternatively, in lieu of having a tab portion 14b the plate may be grooved at this point to accommodate the point of the hook. Also, the end portions 14e of the plate may be turned up to follow the contour of the hook so as to provide more effective shielding thereof.

Referring now to FIG. 5, the hook is shown in its exposed condition in response to a pull on line 18 by the fisherman immediately after the fish has bitten the lure. As can be seen, such pulling of the line while the fish has the lure in its mouth causes the hook to move away from plate 14 to an exposed position where it can be set in the fish's mouth, the point of juncture between spring 16 and hook 20 being drawn downwardly towards plate 14 by the action of the line. This greatly increases the chances of catching the fish.

Referring now to FIGS. 8 and 9, a second embodiment of the invention is illustrated. This second embodiment is closely similar to the first, the only difference being that it is incorporated into a spoon type lure. The plate structure 14 is formed by the spoon and has a slot portion 14a formed in one end thereof. At the end of slot portion 14a the spoon has a grooved portion (not shown), against which the point of hook 20 abuts. The end of the hook is fixedly attached to bent-over wire spring 16 which is fixedly attached to the spoon. The leader line 18 is attached to the spring and hook at the juncture between these two elements, the leader being fitted through eye 16a and aperture 14d in the same fashion as for the first embodiment. Operation of the second embodiment is in the same manner as described for the first in connection with FIG. 5.

While the invention has been described and illustrated in detail, it is to be clearly understood that this is intended by way of illustration and example only and is not to be taken by way of limitation, the spirit and scope of the invention being limited only by the terms of the following claims.

I claim:

1. A snag-proof fishing lure comprising:
   a plate member having an elongated slot formed therein,
   a substantially U-shaped spring attached near one end thereof to said plate member,
   a fish hook having a pointed end and a barbed portion adjacent to said pointed end, the end of said hook opposite the pointed end thereof being attached to the other end of said spring,
   said spring resiliently urging the pointed end of said hook against the plate member with the barbed portion thereof in said slot, the pointed end and barbed portion of the hook being shielded by the plate member against snagging, a fish line attached to said hook substantially at the juncture between the hook and the spring, and means extending from the plate member for guiding said line whereby when said line is pulled, the pointed and barbed ends of the hook are drawn away from the plate member to a position for catching a fish, said last mentioned means comprising a tab extending from said plate member at a position substantially opposite the attachment point of the line to the hook, said tab having an aperture formed therein through which the line runs.

2. The fishing lure of claim 1 wherein said tab is formed in the other end of said spring.

3. The fishing lure of claim 1 and additionally including a body simulating bait having a channel formed therein, said plate being elongated and attached to said body within said channel.

4. The fishing lure of claim 2 wherein the portion of the plate member against which the pointed end of the hook is urged is grooved to form a recess for receiving said end in a shielded position.

5. The fishing lure of claim 2 wherein said plate member comprises a spoon lure.

6. The fishing lure of claim 2 wherein the slot is formed in one end of said plate member, the other end of said plate member having an aperture formed therein through which the spring is fitted.

7. The fishing lure of claim 6 wherein said other end of said plate member is bent up to form a brace for the spring.

* * * * *